(12) United States Patent
Ishii et al.

(10) Patent No.: US 11,694,554 B2
(45) Date of Patent: Jul. 4, 2023

(54) INFORMATION PROCESSING APPARATUS, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Yoshinao Ishii, Nagakute (JP); Keiichiro Hayakawa, Nagakute (JP); Takayoshi Yoshimura, Nagakute (JP); Takahiro Shiga, Nagakute (JP); Ayano Okoso, Nagakute (JP); Tomoki Nishi, Nagakute (JP); Keisuke Otaki, Nagakute (JP)

(73) Assignee: TOYOTA IIDOSHA KABUSHIKI KAISHA, Toyota (JP)

(*) Notice: Subject to any disclaimer, the term of this patent is extended or adjusted under 35 U.S.C. 154(b) by 199 days.

(21) Appl. No.: 17/208,527

(22) Filed: Mar. 22, 2021

(65) Prior Publication Data
US 2021/0304615 A1  Sep. 30, 2021

(30) Foreign Application Priority Data
Mar. 27, 2020  (JP) .................. 2020-057771

(51) Int. Cl.
*G08G 1/00* (2006.01)
*G08G 1/01* (2006.01)

(52) U.S. Cl.
CPC .......... *G08G 1/202* (2013.01); *G08G 1/0129* (2013.01); *G08G 1/0145* (2013.01); *G08G 1/205* (2013.01)

(58) Field of Classification Search
None
See application file for complete search history.

(56) References Cited

U.S. PATENT DOCUMENTS

| | | | |
|---|---|---|---|
| 2012/0221493 A1* | 8/2012 | Bill .................... | G01C 21/3617 706/11 |
| 2013/0346016 A1* | 12/2013 | Suzuki ................ | A61B 5/1123 702/141 |
| 2019/0266625 A1* | 8/2019 | Kikuchi ................ | G06Q 50/30 |
| 2019/0332977 A1 | 10/2019 | Ishiguro et al. | |

FOREIGN PATENT DOCUMENTS

| | | | |
|---|---|---|---|
| JP | 2003108743 A | * | 4/2003 |
| JP | 2015-219673 A | | 12/2015 |
| WO | 2018/207878 A1 | | 11/2018 |

OTHER PUBLICATIONS

Kamalpour, Mostafa & Rezaei Aghdam, Atae & Xu, Shuxiang & Khani, Ehsan & Baghi, Aryan. (2017). Uncovering Hotel Guests Preferences through Data Mining Techniques. (Year: 2017).*

* cited by examiner

*Primary Examiner* — Yonel Beaulieu
*Assistant Examiner* — Charles Pall
(74) *Attorney, Agent, or Firm* — Sughrue Mion, PLLC

(57) ABSTRACT

A controller of an information processing apparatus disclosed obtains first information about a tendency of move of a user staying in a specific facility. The controller forecasts, on the basis of the first information, an expected destination of move to which the user will move from the specific facility and an expected time slot of move during which the user will start to move from the specific facility to the expected destination of move. The controller calculates the number of users who are expected to move from the specific facility to the expected destination of move in each expected time slot of move on a slot-by-slot basis.

7 Claims, 6 Drawing Sheets

| CANDIDATE DESTINATION | PROPERTY |
|---|---|
| CANDIDATE DESTINATION A | CULTURAL HERITAGE |
| CANDIDATE DESTINATION B | SHOPPING |
| CANDIDATE DESTINATION C | ACTIVITY |
| CANDIDATE DESTINATION D | SCENIC SPOT |
| CANDIDATE DESTINATION E | RESTAURANT |
| CANDIDATE DESTINATION F | HISTORICAL HERITAGE |
| ⋮ | ⋮ |

[Fig. 4]

| USER ID | SELECTION PROPERTY | TIME SLOT | MOVE RECORD |
|---------|--------------------|-----------|-------------|
| U001 | SCENIC SPOT | --- | --- |
| U002 | HISTORICAL HERITAGE | --- | --- |
| U003 | CULTURAL HERITAGE | --- | --- |
| U004 | ACTIVITY | --- | --- |
| U005 | SHOPPING | --- | --- |
| U006 | RESTAURANT | --- | --- |
| ⋮ | ⋮ | ⋮ | ⋮ |

ically stored in a non-transitory storage medium such as a ROM. Note that these hardware entries don't quite match —

INFORMATION PROCESSING APPARATUS, INFORMATION PROCESSING METHOD, AND INFORMATION PROCESSING SYSTEM

CROSS REFERENCE TO THE RELATED APPLICATION

This application claims the benefit of Japanese Patent Application No. 2020-057771, filed on Mar. 27, 2020, which is hereby incorporated by reference herein in its entirety.

BACKGROUND

Technical Field

The present disclosure relates to an information processing apparatus, an information processing method, and an information processing system.

Description of the Related Art

It is known in prior art to forecast demand for taxis (i.e. the number of passengers) in an area taking into consideration variations of the population in the area depending on the weather, time and other factors (see, for example, Patent Literature 1 in the citation list below).

CITATION LIST

Patent Literature

Patent Literature 1: WO2018/207878

SUMMARY

An object of this disclosure is to provide a technology that enables accurate forecast of user's demand for move.

Disclosed herein is an information processing apparatus. The information processing apparatus may comprise, for example, a controller including at least one processor.

The controller may be configured to execute the processing of:
obtaining first information, the first information being information about a tendency of move of a user staying in a specific facility, and
forecasting second information on the basis of the first information, the second information being information about the number of users who are expected to move from the specific facility.

Also disclosed herein is an information processing method. The information processing method may comprise the following steps of processing executed by a computer:
obtaining first information, the first information being information about a tendency of move of a user staying in a specific facility, and
forecasting second information on the basis of the first information, the second information being information about the number of users who are expected to move from the specific facility.

Also disclosed herein is an information processing system including an information processing apparatus for forecasting information about the number of users who are expected to move from a specific facility and a facility terminal provided in the specific facility to dispatch taxis.

The information processing apparatus may be configured to execute the processing of:

forecasting an expected destination of move defined as a destination to which the user staying in the specific facility will move from the specific facility,
forecasting an expected time slot of move defined as a time slot in which the user staying in the specific facility will start to move from the specific facility to the expected destination of move;
calculating the number of users who are expected to move from the specific facility to the expected destination of move in each expected time slot of move on a slot-by-slot basis; and sending the result of calculation to the facility terminal.

The facility terminal may be configured to execute the processing of dispatching taxis on the basis of the result of the calculation.

Also disclosed herein is an information processing program configured to cause a computer to implement the above-described information processing method and a non-transitory storage medium in which this information processing program is stored.

This disclosure provides a technology that enables accurate forecast of user's demand for move.

DESCRIPTION OF THE EMBODIMENTS

The technology disclosed is characterized by improved forecast of demand for move from a certain facility in the service of dispatching vehicles, such as taxis and buses, for on-demand passenger transportation. Such vehicles will also be simply referred to as taxis in the following description.

When there is demand for move from a stay facility (which will be referred to as "specific facility"), such as a hotel in an area for tourists, a system providing vehicle dispatch service (which will also be referred to as "vehicle dispatch system" hereinafter) is desired to dispatch an appropriate number of taxis or an appropriate type or types of taxis to the specific facility to meet the demand for move.

The information processing apparatus according to this disclosure has a controller configured to obtain information (first information) about a tendency of move of each user staying in the specific facility. The first information may include, for example, information about a property of destinations that the user tends to select (which will be referred to as "selection property") and information about a time slot in which the user tend to start to move to his/her destination (which will be referred to as "move start time slot"). The selection property are determined based on the properties of the destinations actually selected by the user in the past (namely, the destinations to which the user actually moved in the past). For example, the number of actual visits of the user to the destinations may be counted on a property-by-property basis, and the property with the largest number of visits may be determined as the selection property. The destinations to which the user actually moved in the past are not limited to destinations to which the user moved from the specific facility (namely, destinations to which the users moved during his/her stay in the specific facility). The destinations to which the user actually moved in the past also include destinations to which the user moved from places other than the specific facility (e.g. other stay facilities and the user's home etc.). The move start time slot is determined based on time slots in which the user started to move to destinations in the past. For example, the move start time slot may be determined as the average of time slots in which the user started to move to destinations in the past or the most frequent time slot among such time slots. The controller forecasts second information on the basis of the first information. The second information is information about the number of users expected to move from the specific facility. In this way, the information processing apparatus can accurately forecast the number of users who are expected to move from the specific facility. In consequence, the information processing apparatus can forecast the number of taxis to be dispatched to the specific facility or the type/types of taxis to be dispatched to the specific facility (e.g. the type/types of seating capacity or the type/types of taxis for the handicapped).

In forecasting the second information, the controller may forecast a destination to which each user staying in the specific facility will move from the specific facility (which will be referred to as "expected destination of move") and a time slot in which the user will start to move to the expected destination of move from the specific facility (which will be referred to as "expected time slot of move"). The controller may calculate the number of users who are expected to move to the expected destination of move from the specific facility in each of the time slots of move on a slot-by-slot basis. Thus, it is possible to forecast the number of users who are expected to move from the specific facility in each time slot to each of the expected destinations of move on a destination-by-destination basis. In consequence, it is possible to forecast the number or the types of taxis to be dispatched to the specific facility in each time slot on a destination-by-destination basis.

The information processing apparatus may be further provided with a storage unit that stores "candidate destination data" and a "user model". The controller may forecast a destinations to which a user staying in the specific facility is expected to move on the basis of the candidate destination data and the user model. The candidate destination data is data including information about places (or candidate destinations) that can be selected as destinations to which the user will move from the specific facility. The user model is a model that relates the candidate destinations specified by the candidate destination data and a tendency of move of the user staying in the specific facility to each other. The information processing apparatus configured as above can forecast a destination to which the user staying in the specific facility is expected to move on the basis of the tendency of move of the user.

The aforementioned user model may be constructed as, for example, a model that relates a selection property of a user staying in the specific facility and the likelihoods that the user having the selection property selects the respective candidate destinations as a destination of move on a destination-by-destination basis. Such a user model may be configured in such a way as to output the likelihoods of selection of the respective candidate destinations when the selection property of the user staying in the specific facility is input thereto. Thus, it is possible to determine the likelihoods of selection of the respective candidate destinations by a user having a tendency of selecting places having a specific selection property as destinations. With this model, the candidate destination of which the likelihood of selection is highest is considered to be most likely to be selected by the user having that specific selection property. Therefore, the controller may forecast the candidate destination of which the likelihood output from the user model is highest as the expected destination of move of the user staying in the specific facility. This improves the accuracy of forecast of the expected destination of move of the user staying in the specific facility.

The above user model may be configured such that the likelihood of selection of a candidate destination at a smaller distance from the specific facility is higher than the likelihood of selection of a candidate destination at a larger distance from the specific facility. This is because users staying in a facility, such as a hotel, are more likely to select as a destination a place at a smaller distance from the facility than a place at a larger distance from the facility.

The storage unit may further store information about places among the candidate destinations to which the user staying in the specific facility has already visited during his/her stay in the specific facility (which will also be referred to as "already-visited candidates"). This information will also be referred to as "move record information" hereinafter. The controller may forecast the candidate destination of which the likelihood output from the user model is highest among the candidate destinations excepting the places specified by the move record information as the expected destination of move of the user staying in the specific facility. This is because it is considered improbable that users staying in a facility having a plurality of candidate destinations will visit the same destination repeatedly during their stay in the facility.

If the controller obtains information about a user who is going to cease to stay in the specific facility, the controller may forecast the station of transportation facilities nearest to the specific facility among the stations of transportation facilities as the expected destination of move of the user. This improves the accuracy of forecast of the destination of move of the user who is going to cease to stay in the specific facility.

The controller of the information processing apparatus may determine the number of taxis to be dispatched to the specific facility on the basis of the second information. Thus, it is possible to dispatch an appropriate number of taxis commensurate with the number of users who are expected to move from the specific facility. In the case where the controller is configured to calculate the number of users who are expected to move from the specific facility in each of the expected time slots of move, the controller may determine the numbers of taxis to be dispatched to the specific facility in the respective expected time slots of move on a slot-by-slot basis. Thus, it is possible to dispatch an appropriate number of taxis commensurate with the number of users who are expected to move from the specific facility in each time slot.

In the following, a specific embodiment of the technology disclosed herein will be described with reference to the drawings. It should be understood that the dimensions, materials, shapes, relative arrangements, and other features of the components that will be described in connection with the embodiment are not intended to limit the technical scope of the disclosure only to them, unless otherwise stated.

EMBODIMENT

A vehicle dispatch system to which the technology disclosed herein is applied will be described in the following as an embodiment.

(General Configuration of Taxi Dispatch System)

Figure 1:
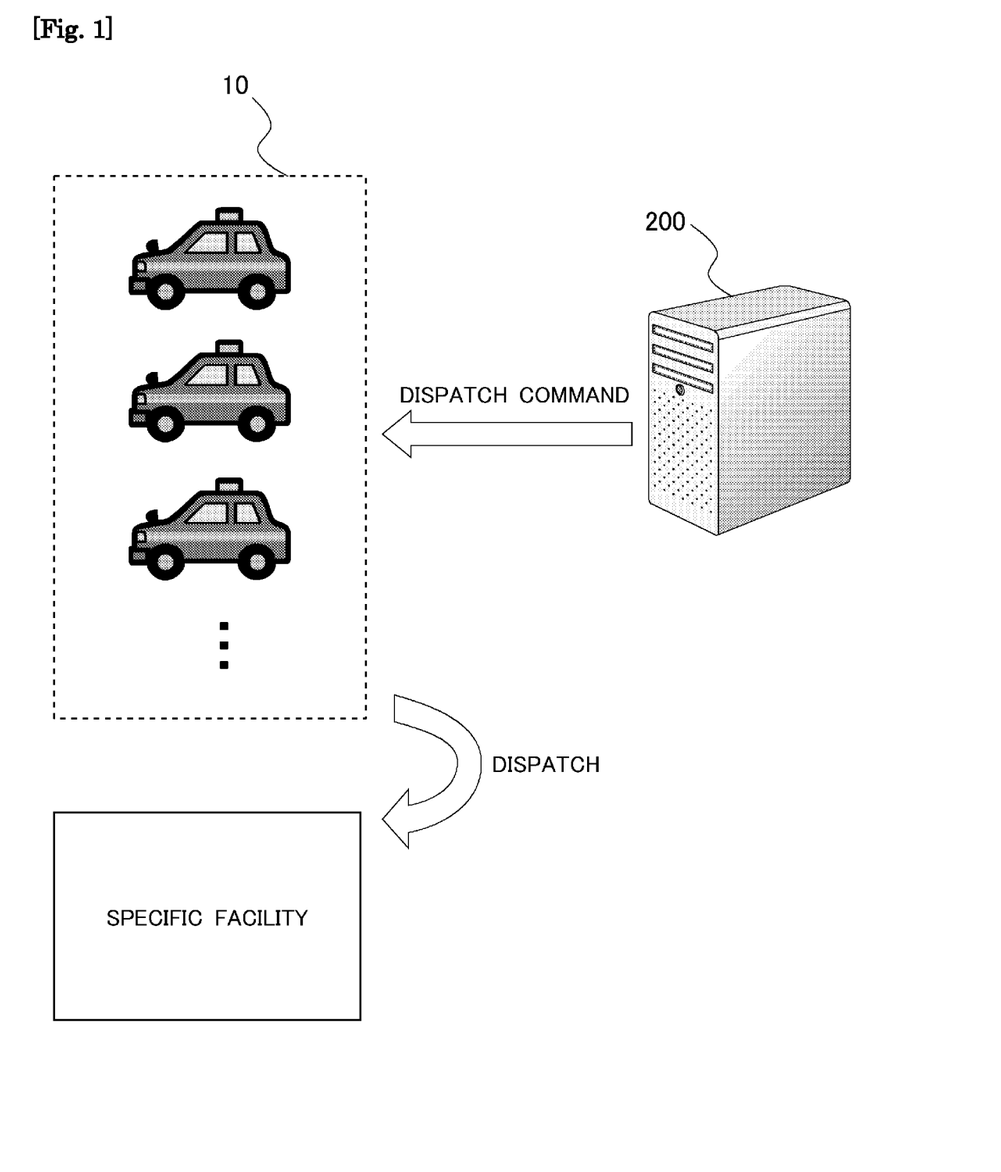
FIG. 1 is a diagram illustrating an exemplary configuration of a vehicle dispatch system.

FIG. 1 is a diagram illustrating a vehicle dispatch system that dispatches taxis to a stay facility (specific facility), such as a hotel. The vehicle dispatch system illustrated in FIG. 1 includes a plurality of taxis 10 and a server apparatus 200.

The taxis 10 are vehicles for transporting passengers. The taxis 10 used in the vehicle dispatch system of this embodiment include various types of vehicles that vary in the seating capacity, having/not-having equipment for the handicapped, and other respects.

The server apparatus 200 constitutes the information processing apparatus according to this disclosure. The server apparatus 200 is configured to forecast the number of users that will move from a specific facility on the basis of a user model created in advance and candidate destination data. The server apparatus 200 in the system of this embodiment also has the function of dispatching taxis 10 to the specific facility on the basis of the forecast number of users.

(Configuration of Server Apparatus)

Figure 2:
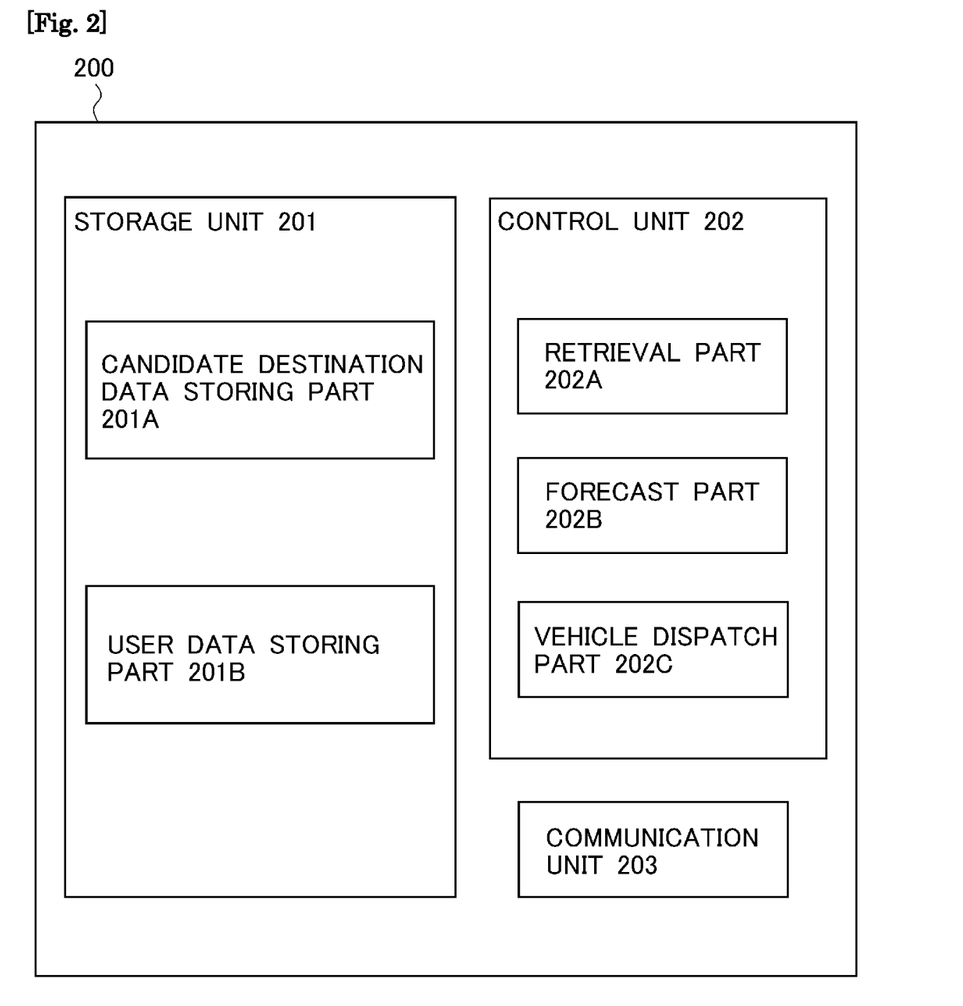
FIG. 2 is a diagram illustrating an exemplary configuration of a server apparatus.

FIG. 2 is a block diagram schematically illustrating an exemplary configuration of the server apparatus 200. The server apparatus 200 includes a storage unit 201, a control unit 202, and a communication unit 203. The server apparatus 200 is constructed by an ordinary computer having a processor and a memory.

The storage unit 201 is a device that stores data used to forecast the number of users moving from the specific facility. The storage unit 201 includes, for example, a ROM, a RAM, or a non-transitory storage medium, such as a magnetic disk or a flash memory. The storage unit 201 includes a candidate destination data storing part 201A that stores data relating to candidate destinations and a user data storing part 201B that stores data relating to tendencies of move of users. What is stored in the storage unit 201 also includes programs (such as an operating system and a user model) executed by the control unit 202, which will be described later, and data used by the programs.

The candidate destination data storing part 201A is a database that stores data relating to places that can be selected as destinations of move from the specific facility (namely, candidate destinations). An example of the candidate destinations is a popular tourist destination located near the specific facility. The candidate destination data storing part 201A is constructed by managing data stored in a memory by a database management system program (DBMS program) executed by a processor. The candidate destination data storing part 201A in the system of this embodiment is, for example, a relational database. The data stored in the candidate destination data storing part 201A may be generated by an external apparatus independent of the server apparatus 200 and retrieved through a network or a storage medium. The external apparatus may be, for example, a server apparatus that is used for the purpose of management of the specific facility or a server apparatus that manages tourism in the overall area in which the specific facility is located.

Figure 3:
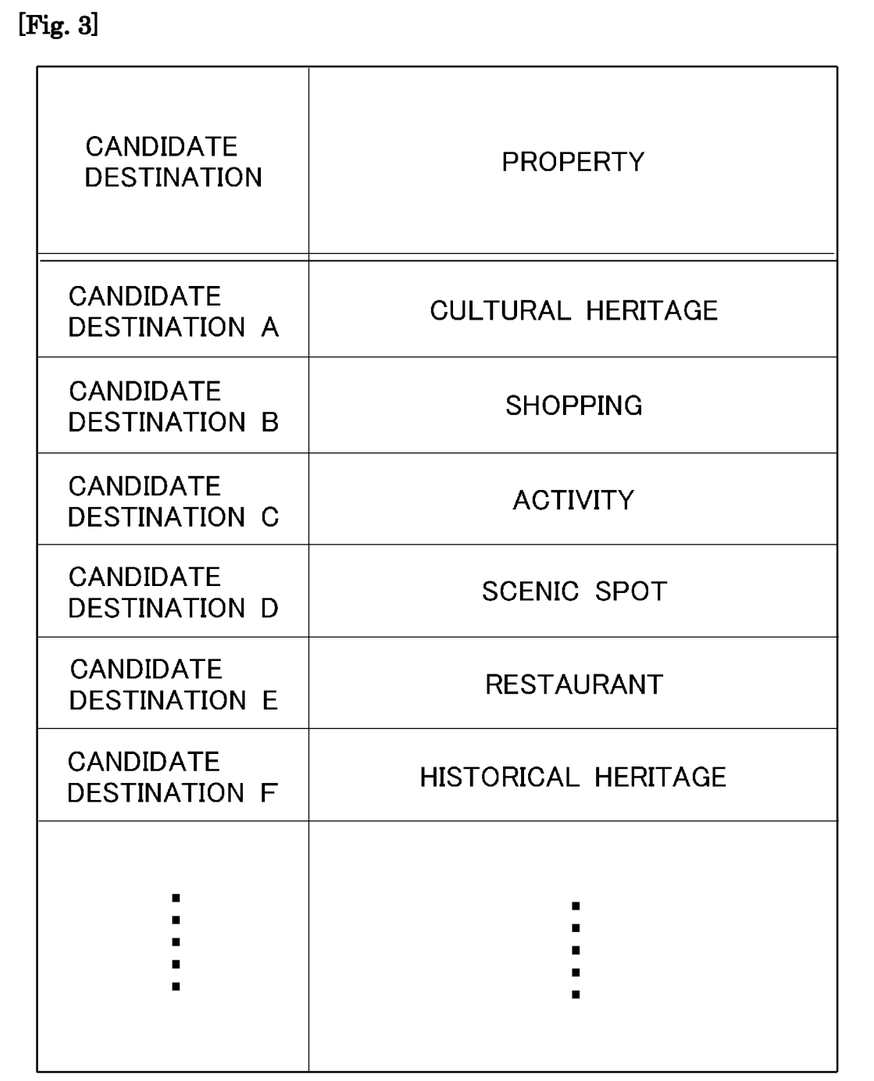
FIG. 3 illustrates an exemplary table structure of data stored in a candidate destination data storing part.

FIG. 3 illustrates exemplary candidate destination data stored in the candidate destination data storing part 201A. FIG. 3 illustrates the table structure of the data stored in the candidate destination data storing part 201A. The candidate destination data storing part 201A links candidate destinations and properties with each other. It should be understood that the structure of the table stored in the candidate destination data storing part 201A is not limited to that illustrated in FIG. 3, but some fields may be added, changed, or removed fitly. This table will also be referred to as "candidate destination information table" hereinafter.

The candidate destination information table illustrated in FIG. 3 has the fields of candidate destination and property. What is stored in the candidate destination field is information identifying each candidate destination, which may be, for example, the name of each candidate destination or an identification number of each candidate destination. What is stored in the property field is information indicating a property of each candidate destination. For example, in the case where a candidate destination is a place for appreciating cultural heritage, such as a tangible cultural asset, an intangible cultural asset, an ethnic cultural asset, or a monument, the property "cultural heritage" is stored in the property field linked with that candidate destination. In the case where a candidate destination is a place for appreciating historical heritage, such as a shrine, a temple, or the site of a castle, the property "historical heritage" is stored in the property field linked with that candidate destination. In the case where a candidate destination is a place for doing shopping, such as a shopping mall, the property "shopping" is stored in the property field linked with that candidate destination. In the case where a candidate destination is a place for enjoying an activity, such as outdoor experience or culture experience, the property "activity" is stored in the property field linked with that candidate destination. In the case where a candidate destination is a place for viewing a landscape, the property "scenic spot" is stored in the property field linked with that candidate destination. If a candidate destination is a place for eating and drinking, the property "restaurant" is stored in the property field linked with that candidate destination.

The user data storing part 201B is a database that stores information about tendencies of move of the users staying in the specific facility, who will also be referred to as the "staying users" hereinafter. The information stored in the user data storing part 210B will also be referred to as "move tendency data" hereinafter. The user data storing part 210B is constructed by managing data stored in the memory by the DBMS program executed by the processor. The user data storing part 201B in the system of this embodiment is, for example, a relational database. The data stored in the user data storing part 201B may be generated by an external apparatus independent of the server apparatus 200 and retrieved through a network or a storage medium. The external apparatus may be, for example, a server apparatus that manages tendencies of move of the users in a country.

Figure 4:
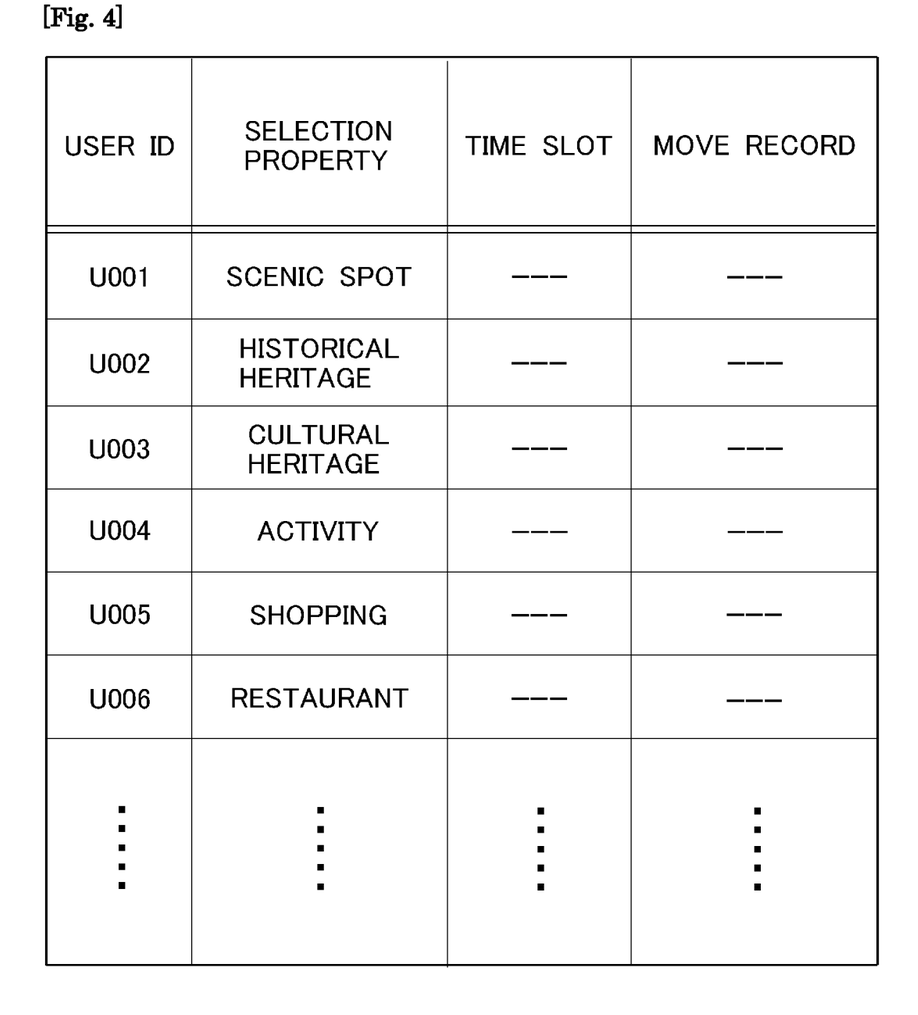
FIG. 4 illustrates an exemplary table structure of data stored in a user data storing part.

FIG. 4 illustrates exemplary move tendency data stored in the user data storing part 201B. FIG. 4 illustrates the table structure of the data stored in the user data storing part 201B. The user data storing part 201B links the staying users and tendencies of move with each other. It should be understood that the structure of the table stored in the user data storing part 201B is not limited to that illustrated in FIG. 4, but some fields may be added, changed, or removed fitly. This table will also be referred to as "move tendency information table" hereinafter.

The move tendency information table illustrated in FIG. 4 has the fields of user ID, selection property, time slot, and move record. What is stored in the user ID field is information for identifying each staying user (i.e. user ID). The user ID used in the system of this embodiment is information for distinguishing each of the users from the other users staying in the specific facility while keeping their anonymity. Therefore, the user ID of each user does not include information by which he or she can be identified as a specific individual (e.g. the name, address, date of birth, or biological information).

What is stored in the selection property field is information about the property of places that each staying user tends to select as his/her destination of move. For example, in the case where a staying user tends to select a place for viewing a landscape as his/her destination of move, the property "scenic spot" is stored in the selection property field linked with that staying user. In the case where a staying user tends to select a place for appreciating historical heritage as his/her destination of move, the property "historical heritage" is stored in the selection property field linked with that staying user. In the case where a staying user tends to select a place for appreciating cultural heritage as his/her destination of move, the property "cultural heritage" is stored in the selection property field linked with that staying user. In the case where a staying user tends to select a place for enjoying an activity as his/her destination of move, the property "activity" is stored in the selection property field linked with that staying user. In the case where a staying user tends to select a place for doing shopping as his/her destination of move, the property "shopping" is stored in the selection property field linked with that staying user. In the case where a staying user tends to select a place for eating and drinking as his/her destination of move, the property "restaurant" is stored in the selection property field linked with that staying user.

The information stored in the selection property field is determined on the basis of a record of moves of each staying user. For example, the number of actual visits of each staying user to destinations in the past may be counted on a property-by-property basis, and the property with the largest count may be stored in the selection property field. The destinations relevant to this counting are not limited to the destinations to which the staying user moved from the specific facility (or the destinations to which the user visited during his/her stay in the specific facility). In other words, the destinations relevant to the above counting include the destinations to which the staying user actually moved from places other than the specific facility (e.g. stay facilities other than the specific facility or the user's home) in the past. The record of moves of each staying user may be obtained, for example, on the basis of location information of a user's terminal. The user's terminal may be, for example, a small computer that can be carried by the user. Examples of the user's terminal include a smartphone, a cellular phone, a tablet terminal, and a wearable computer (such as a smartwatch). Location information calculated by a GPS (Global Positioning System) receiver of the user's terminal may be used as the location information of the user's terminal. It is possible to make a record of moves of each staying user by periodically collecting location information calculated by the GPS receiver of the user's terminal through a network. Records of moves of the staying users may be obtained using an external service that collects records of moves of a large number of unspecified users including users other than the staying users. In this case, the users who have a record of move to the specific facility from a remote place may be identified as the users staying in the specific facility. Alternatively, the users who went through the procedure of checking-in at the specific facility may be identified as the users staying in the specific facility.

What is stored in the time slot field is information about a time slot in which each staying user tends to start to move to a destination. This time slot will also be referred to as the "move start time slot" hereinafter. The move start time slot is determined on the basis of the record of moves of each staying user. For example, the move start time slot is determined as the average of time slots in which the staying user started to move to destinations in the past or the time slot in which the staying user started to move to destinations most frequently among them.

What is stored in the move record field is information (move record information) about the places to which each staying user has already visited during his/her stay in the specific facility among the candidate destinations that can be selected as destinations of move from the specific facility. The aforementioned places will be referred to as the "already-visited candidates" hereinafter. The already-visited candidates can be identified on the basis of the record of moves of each staying user during his/her stay in the specific facility.

The control unit 202 is an computing device that controls the functions of the server apparatus 200. The control unit 202 includes a computational processing device, such as a CPU (Central Processing Unit) or a DSP (Digital Signal Processor). The control unit 202 according to this embodiment has, as functional modules, a retrieval part 202A, a forecast part 202B, and vehicle dispatch part 202C. The control unit 202 implements these functional modules by executing programs stored in the storage unit 201 by a CPU or a DSP.

The retrieval part 202A obtains information about a tendency of move of each staying user. This information constitutes the first information according to this disclosure. Specifically, the retrieval part 202A accesses the move tendency information table of the user data storing part 201B to retrieve information stored in the selection property field, the time slot field, and the move record field, namely information about the selection property, information about the move start time slot, and information about the already-visited candidates. The information obtained by the retrieval part 202A is passed to the forecast part 202B.

The forecast part 202B forecasts the number of users who are expected to move from the specific facility on the basis of the information passed from the retrieval part 202A (namely, information about the selection property, the move start time slot, and the already-visited candidates). This number of users will also be referred to as the "the number of users expected to move" hereinafter. The number of users expected to move is forecast with respect to each of the expected destinations of move on a destination-by-destination basis. Moreover, the number of users expected to move to each destination is forecast with respect to each of the expected time slots of move on a slot-by-slot basis. This forecasting process is executed on the day before the day for which the forecast is performed. In other words, the forecast part 202B forecasts the number of users expected to move in each expected time slot of move of the next day with respect to each of the expected destinations of move. The forecast part 202B may forecast only the number of users expected to move in the morning of the next day, and the forecast of the number of users expected to move in the afternoon may be conducted in the morning of the same day.

Figure 5:
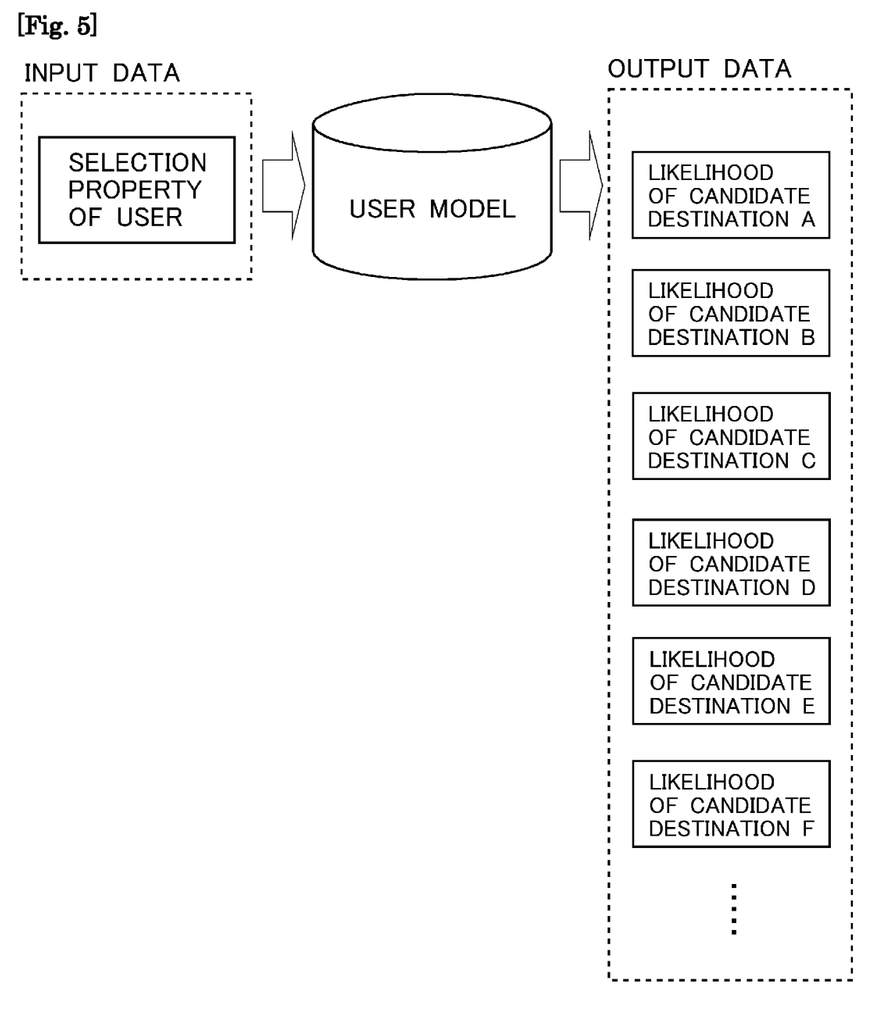
FIG. 5 is a diagram illustrating an exemplary user model used in an embodiment.

In the process of forecasting the number of users expected to move, the forecast part 202B firstly forecasts a destination to which each staying user is expected to move. The forecast of an expected destination of move is conducted on the basis of a user model and the candidate destination data stored in the candidate destination data storing part 201A. The user model is a model that relates the candidate destinations specified by the candidate destination data and tendencies of move of the staying users to each other. This user model is stored in the storage unit 201. The user model used in the system of this embodiment is, for example, a calculation model that is configured to output the likelihoods of selection of the respective candidate destinations as output data when the selection property of a staying user is input to it as input data as illustrated in FIG. 5. This calculation model may be configured to calculate the likelihood of selection of a candidate destination that is at a smaller distance from the specific facility higher than the likelihood of selection of a candidate destination that is at a larger distance from the specific facility. This user model is a machine learning model that is built using record data as teacher data. The record data mentioned above is, for example, information about the probabilities of actual selection of the properties of destinations by a staying user in relation to the selection property of that user. In the case where the above-described machine learning model is used as the user model, relearning of the user model may be performed using the above-described record data. This can improve the accuracy in forecasting destinations of move. The user model may be constructed as a database that relates each selection property of the staying users and the likelihood of selection of each of the candidate destinations by the staying users having that selection property.

In the process of forecasting a destination to which a staying user is expected to move, the forecast part 202B forecasts or selects the candidate destination of which the likelihood output from the above-descried user model is highest as the forecast destination. There may be cases where the candidate destination of which the likelihood output from the user model is highest is a place to which the staying user has already visited during his/her stay in the specific facility. In such cases, the forecast part 202B selects the candidate destination of which the likelihood output from the above-descried user model is second highest as the forecast destination to which the staying user is expected to move. After the staying user ceases to stay in the specific facility, in other words, after the staying user checks out of the specific facility, it is probable that he or she goes to a station of transportation facilities without going to any tourist site. Therefore, in the case where the day for which the number of users expected to move is forecast (e.g. the next day) is the day on which the staying user is scheduled to check out of the staying facility, the forecast part 202B may select the station of transportation facilities nearest to the specific facility as the forecast destination to which the staying user is expected to move. In this connection, information about the scheduled date of staying user's checking-out may be provided by the specific facility or obtained based on schedule information stored in the user's terminal of the staying user.

After forecasting the destination to which the staying user is expected to move, the forecast part 202B forecasts a time slot in which the staying user is expected to start to move from the specific facility to the expected destination of move (i.e. the expected time slot of move). This forecast is performed on the basis of the move start time slot of the staying user and the hours over which the entrance into the place of the expected destination of move is allowed (i.e. the opening hours or the business hours of the place). For example, in the case where the place of the expected destination of move does not limit the opening hours, the forecast part 202B forecasts or selects the move start time slot of the staying user as the expected time slot of move. In the case where the place of the expected destination of move specifies the opening hours, the forecast part 202B forecasts as the expected time slot of move the time slot of staying user's departing from the specific facility that is closest to the move start time slot of the staying user while enabling the staying user to arrive at the expected destination of move within the opening hours of the place. For example, in a case where the opening hours of the place of the expected destination of move is 10 to 18 o'clock, and the time slot of user's departing from the specific facility that enables the staying user to arrive at the place of the expected destination of move within the aforementioned opening hours is 9 to 17 o'clock, if the move start time slot of the staying user is 8 to 9 o'clock, the expected time slot of move is forecast as 9 to 10 o'clock. The method of forecasting the expected time slot of move is not limited to the above method. The expected time slot of move may be forecast on the basis of the records of moves of the users who moved from the specific facility to the expected destination of move in the past. For example, the expected time slot of move may be forecast as the time slot in which the number of the users who moved from the specific facility to the expected destination of move in the past is largest.

After completing the forecast of the expected destination of move and the expected time slot of move for all the users staying in the specific facility, the forecast part 202B counts the number of users who are expected to move to each of the expected destinations of move in each expected time slot of move on a destination-by-destination basis. Thus, the number of users who are expected to move to each of the expected destinations of move in each expected time slot of move is determined.

The vehicle dispatch part 202C determines a vehicle dispatch plan for the next day, which specifies the number and/or the type/types of taxis 10 to be dispatched to the specific facility on the next day, on the basis of the result of forecast by the forecast part 202B. For example, the number of taxis 10 to be dispatched may be made larger in time slots in which the number of users who are expected to move is large than in time slots in which the number of users who are expected to move is small. If there is an expected destination of move to which a relatively large number of users are expected to move in a certain expected time slot of move, at least one taxi 10 of the type having a large seating capacity may be included among the taxis 10 to be dispatched in that expected time slot of move.

The communication unit 203 is a device that connects the server apparatus 200 to a network. The communication unit 203 typically includes a LAN (Local Area network) interface board. The network may be, for example, a WAN (Wide Area Network), which is a global public communication network, such as the Internet, or other communication network. The communication unit 203 may be connected to the network by wireless communications, such as 5G (5th Generation) mobile communications or LTE (Long Term Evolution) mobile communications. The wireless communications may be narrow-band communications, such as DSRC (Dedicated Short Range Communications) or WiFi (registered trademark). As the server apparatus 200 is connected to the network through the communication unit 203, it can perform data communications with external apparatuses, such as communication apparatuses provided in the taxis 10, a terminal provided in the specific facility, and terminals that provide the various external services described above.

(Process Performed by Server Apparatus)

Figure 6:
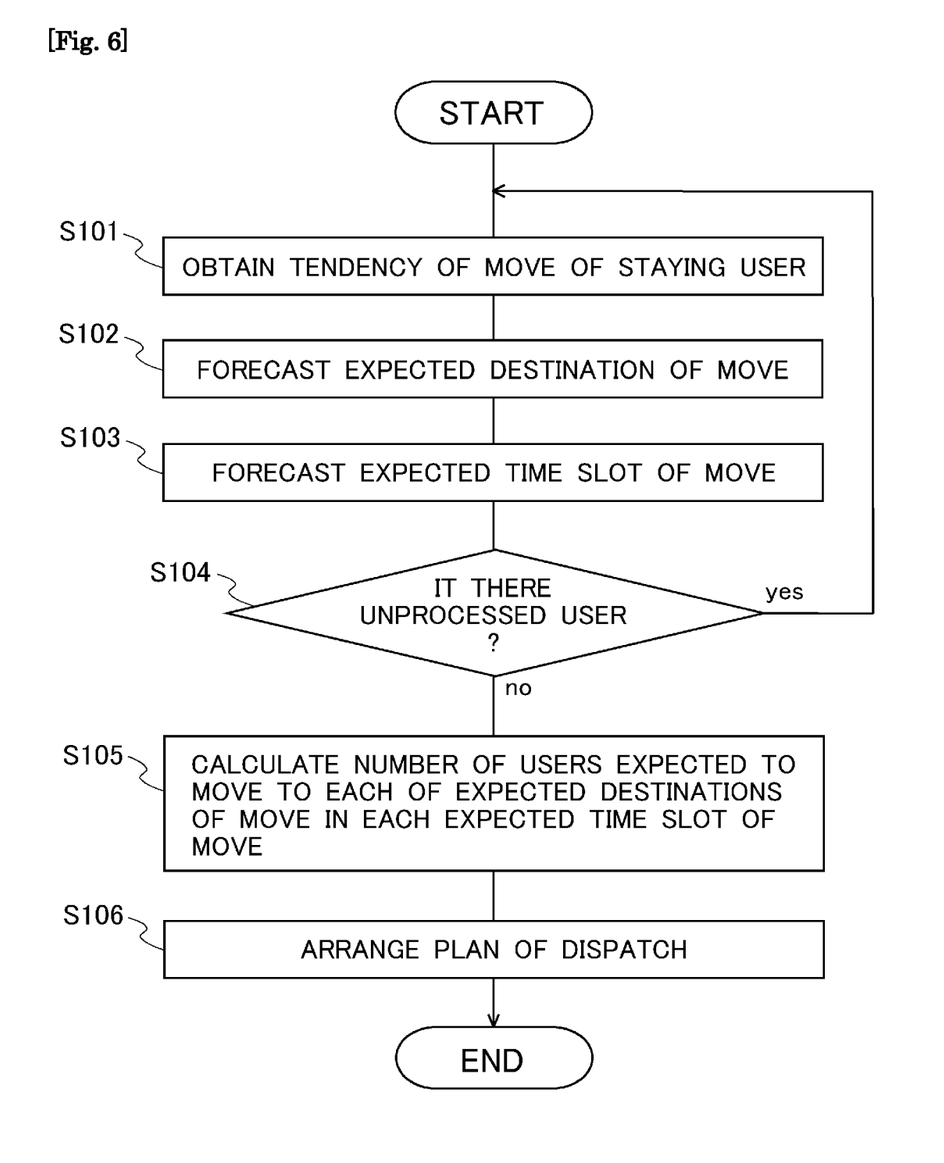
FIG. 6 is a flow chart of a process executed by the server apparatus.

A process performed by the server apparatus 200 according to the disclosure will be described with reference to FIG. 6. FIG. 6 is a flow chart of a process executed by the server apparatus 200 to determine the number and/or the type(s) of taxis 10 to be dispatched to the specific facility on the next day.

In the process according to the flow chart of FIG. 6, the retrieval part 202A of the control unit 202 obtains information about a tendency of move of a staying user (step S101). Specifically, as described above, the retrieval part 202A accesses the move tendency information table in the user data storing part 201B to retrieve information about the selection property, information about the move start time slot, and information about the already-visited candidates. The information retrieved by the retrieval part 202A is passed to the forecast part 202B.

The forecast part 202B forecasts a destination to which the staying user is expected to move (i.e. an expected destination of move) on the basis of the information passed from the retrieval part 202A (step S102). Specifically, as described above, the forecast part 202B inputs the selection property of the staying user to the user model as input data to obtain the respective likelihoods of selection of candidate destinations. Then, the forecast part 202B extracts the candidate destination of which the likelihood output by the user model is highest. If the candidate destination thus extracted is not included in the already-visited candidates specified in the move record information, the forecast part 202B forecasts this candidate destination as the expected destination of move. If the candidate destination thus extracted is included in the already-visited candidates specified in the move record information, the forecast part 202B forecasts the candidate destination of which the likelihood output by the user model is second highest as the expected destination of move. If the next day is the day on which the staying user is scheduled to check out of the specific facility, the forecast part 202B forecasts the station of transportation facilities nearest to the specific facility among the stations of transportation facilities as the expected destination of move.

Moreover, the forecast part 202B forecasts a time slot in which the staying user is expected to move (i.e. an expected time slot of move) on the basis of the information passed from the retrieval part 202A (step S103). Specifically, as described above, the forecast part 202B forecasts the expected time slot of move on the basis of the move start time slot of the staying user and the opening hours of the place of the expected destination of move forecast in step S102. In the case where the place of expected destination of move forecast in step S102 does not limit the opening hours, the forecast part 202B forecasts the move start time slot of the staying user as the expected time slot of move. On the other hand, in the case where the place of expected destination of move forecast in step S102 has limited opening hours, the forecast part 202B forecasts as the expected time slot of move the time slot of staying user's departing from the specific facility that is closest to the move start time slot of the staying user while enabling the staying user to arrive at the expected destination of move within the opening hours of the place. If the next day is the day on which the staying user is scheduled to check out of the specific facility, the forecast part 202B forecasts as the expected time slot of move a time slot that includes the checkout time prescribed by the specific facility.

Then, the forecast part 202B determines whether or not there is an unprocessed staying user for whom the processing of forecasting an expected destination of move and an expected time slot of move has not been executed yet (step S104). If there is a staying user for whom the processing of forecasting an expected destination of move and an expected time slot of move has not been executed yet (an affirmative answer in step S104), the process returns to step S101. Then, the processing of steps S101 to S103 is executed for the unprocessed staying user. On the other hand, if there is no unprocessed staying user (a negative answer in step S104), the process proceeds to step S105.

In step S105, the forecast part 202B calculates the number of users who are expected to move to each of the expected destinations of move in each expected time slot of move on a destination-by-destination basis. The result of this calculation (or the result of forecast) is passed from the forecast part 202B to the vehicle dispatch part 202C.

The vehicle dispatch part 202C arranges a plan of dispatch of vehicles on the next day on the basis of the result of forecast passed from the forecast part 202B (step S106). Specifically, the vehicle dispatch part 202C determines the number and/or the type/types of taxis 10 to be dispatched to the specific facility on the next day. For example, the vehicle dispatch part 202C determines the number of taxis 10 to be dispatched to the specific facility in each of the expected time slots of move on the basis of the respective numbers of users who are expected to move in the expected time slots of move. In this process, if there is an expected destination of move to which a relatively large number of users are expected to move in a certain expected time slot of move, the vehicle dispatch part 202C determines to include at least one taxi 10 of the type having a large seating capacity among the taxis 10 to be dispatched in that expected time slot of move.

The above-described vehicle dispatch system according to this embodiment can forecast the number of users who are expected to move from the specific facility to each of the expected destinations of move in each expected time slot of move on a destination-by-destination basis on the basis of the tendencies of move of the staying users. Thus, the system according to this embodiment can forecast demand for move from the specific facility with improved accuracy. This makes it possible to dispatch an appropriate number and type/types of taxis 10 commensurate with the demand for move from the specific facility to the specific facility. Therefore, the system can reduce the time for the users who wish to move to wait for taxis 10. Moreover, the system allows a certain number of staying users to share a type of taxi 10 having a relatively large seating capacity to reduce the fare to be paid by each staying user.

<Modification>

In the above-described system according to the embodiment, the server apparatus 200 executes not only the process of forecasting the number of users who are expected to move but also the process of dispatching taxis 10. Alternatively, the process of dispatching taxis 10 may be executed by an external apparatus independent of the server apparatus 200. In other words, the process executed by the vehicle dispatch part 202C may be executed by an external apparatus. Such an external apparatus may be a server apparatus provided in a company in charge of management of taxis 10 or a terminal (facility terminal) for dispatching vehicles provided in a certain facility. In that case, the external apparatus and the server apparatus jointly constitute the information processing system according to this disclosure.

<Others>

The above embodiment and modification have been described only by way of example. Modifications can be made to them without departing from the essence of this disclosure. For example, some features of the above-described embodiment and modification may be employed in any possible combination.

The processing and means that have been described in the foregoing may be employed in any combination so long as it is technically feasible to do so. One, some, or all of the processes that have been described as processes performed by one apparatus may be performed by a plurality of apparatuses in a distributed manner. One, some, or all of the processes that have been described as processes performed by different apparatuses may be performed by a single apparatus. The hardware configuration employed to implement various functions in a computer system may be modified flexibly.

The technology disclosed herein can be carried out by supplying a computer program(s) (or information processing program) that implements the functions described in the above description of the embodiment to a computer to cause one or more processors of the computer to read and execute the program(s). Such a computer program(s) may be supplied to the computer by a computer-readable, non-transitory storage medium that can be connected to a system bus of the computer, or through a network. The computer-readable, non-transitory storage medium refers to a recording medium that can store information, such as data and programs, electrically, magnetically, optically, mechanically, or chemically in such a way as to allow the computer or the like to read the stored information. Examples of the computer-readable, non-transitory storage medium include any type of disc medium including a magnetic disc, such as a floppy disc (registered trademark) and a hard disk drive (HDD), and an optical disc, such as a CD-ROM, a DVD and a Blu-ray disc. The computer-readable, non-transitory storage medium may include other storage media, such as a read-only memory (ROM), a random access memory (RAM), an EPROM, an EEPROM, a magnetic card, a flash memory, an optical card, and a solid state drive (SSD).

What is claimed is:

1. An information processing apparatus comprising:
a controller including at least one processor; and
a storage unit, wherein the storage unit stores:
candidate destination data including information about candidate destinations that can be selected as a destination of move from a specific facility;
a user model that relates the candidate destinations specified by the candidate destination data and a tendency of move of a user staying in the specific facility to each other; and
move record information defined as information about the candidate destinations to which the user staying in the specific facility has already visited during their stay in the specific facility; and
wherein the controller is configured to execute the processing of:
obtaining first information, the first information being information about the tendency of move of the user staying in the specific facility, and wherein the first information includes information about a selection property defined as a property of a destination that the user tends to select and information about a move start time slot defined as a time slot in which the user tends to start to move to a destination;
forecasting second information on the basis of the first information, the second information being information about a number of users who are expected to move from the specific facility,
wherein, the forecasting the second information includes:
forecasting an expected destination of move defined as a destination to which the user staying in the specific facility will move from the specific facility on the basis of the candidate destination data and the user model;
forecasting an expected time slot of move defined as a time slot in which the user staying in the specific facility will start to move from the specific facility to the expected destination of move; and
wherein
the user model stored in the storage unit is a model that relates the selection property of the user staying in the specific facility to a likelihood that the user having the selection property selects the respective candidate destinations and is configured to output a likelihood of selection of the respective candidate destinations when the selection property of the user staying in the specific facility is input thereto, wherein the likelihood of selection of a candidate destination at a smaller distance from the specific facility is higher than the likelihood of selection of a candidate destination at a larger distance from the specific facility; and
the controller executes the processing of:
extracting a candidate destination of which the likelihood output by the user model is highest;
determining whether the candidate destination that was extracted is included in the candidate destinations of the move record information;
forecasting the candidate destination that was extracted as the expected destination of move of the user staying in the specific facility in a case where the candidate destination that was extracted is not included in the candidate destinations specified by the move record information;
forecasting the candidate destination of which the likelihood output from the user model is highest among the candidate destinations excepting the candidate destinations specified by the move record information as the expected destination of move of the user staying in the specific facility in a case where the candidate destination that was extracted is included in the candidate destinations specified by the move record information;
calculating the number of users who are expected to move from the specific facility to the expected destination of move in each expected time slot of move on a slot-by-slot basis; and
dispatching taxis to the specific facility based on the result of the calculation.

2. An information processing apparatus according to claim 1, wherein if the controller obtains information about the user who is going to cease to stay in the specific facility, the controller forecasts a station of transportation facilities nearest to the specific facility among stations of transportation facilities as the expected destination of move of the user.

3. An information processing apparatus according to claim 1, wherein the controller further executes the processing of determining the number of taxis to be dispatched to the specific facility.

4. An information processing method executed by a computer, wherein the computer includes a processor and a storage unit, wherein the storage unit stores:
candidate destination data including information about candidate destinations that can be selected as a destination of move from a specific facility;
a user model that relates the candidate destinations specified by the candidate destination data and a tendency of move of a user staying in the specific facility to each other; and
move record information defined as information about the candidate destinations to which the user staying in the specific facility has already visited during their stay in the specific facility,
the information processing method comprising:
obtaining first information, the first information being information about the tendency of move of the user staying in the specific facility, and wherein the first information includes information about a selection property defined as a property of a destination that the user tends to select and information about a move start time slot defined as a time slot in which the user tends to start to move to a destination;
forecasting second information on the basis of the first information, the second information being information about a number of users who are expected to move from the specific facility,
wherein, the forecasting the second information includes:
forecasting an expected destination of move defined as a destination to which the user staying in the specific facility will move from the specific facility on the basis of the candidate destination data and the user model;
forecasting an expected time slot of move defined as a time slot in which the user staying in the specific facility will start to move from the specific facility to the expected destination of move; and
wherein
the user model stored in the storage unit is a model that relates the selection property of the user staying in the specific facility to a likelihood that the user having the selection property selects the respective candidate destinations and is configured to output a likelihood of selection of the respective candidate destinations when the selection property of the user staying in the specific facility is input thereto, wherein the likelihood of selection of a candidate destination at a smaller distance from the specific facility is higher than the likelihood of selection of a candidate destination at a larger distance from the specific facility; and
the information processing method further comprising:
extracting a candidate destination of which the likelihood output by the user model is highest;
determining whether the candidate destination that was extracted is included in the candidate destinations of the move record information;
forecasting the candidate destination that was extracted as the expected destination of move of the user staying in the specific facility in a case where the candidate destination that was extracted is not included in the candidate destinations specified by the move record information;
forecasting the candidate destination of which the likelihood output from the user model is highest among the candidate destinations excepting the candidate destinations specified by the move record information as the expected destination of move of the user staying in the specific facility in a case where the candidate destination thus extracted is included in the candidate destinations specified by the move record information;
calculating of the number of users who are expected to move from the specific facility to the expected destination of move in each expected time slot of move on a slot-by-slot basis; and
dispatching taxis to the specific facility based on the result of the calculation.

5. An information processing method according to claim 4, wherein if the computer obtains information about the user who is going to cease to stay in the specific facility, a station of transportation facilities nearest to the specific facility among stations of transportation facilities is forecast as the expected destination of move of the user in the obtaining first information.

6. An information processing method according to claim 4, further comprising determining the number of taxis to be dispatched to the specific facility.

7. An information processing system comprising:
an information processing apparatus for forecasting information about a number of users who are expected to move from a specific facility; and
a facility terminal provided in the specific facility to dispatch taxis,
wherein the information processing apparatus comprises a controller including at least one processor and a storage unit,
wherein the storage unit stores:
candidate destination data including information about candidate destinations that can be selected as a destination of move from the specific facility;
a user model that relates the candidate destinations specified by the candidate destination data and a tendency of move of a user staying in the specific facility to each other; and
move record information defined as information about the candidate destinations to which the user staying in the specific facility has already visited during their stay in the specific facility; and
wherein the controller is configured to execute the processing of:
obtaining first information, the first information being information about the tendency of move of the user staying in the specific facility, and wherein the first information includes information about a selection property defined as a property of a destination that the user tends to select and information about a move start time slot defined as a time slot in which the user tends to start to move to a destination;
forecasting second information on the basis of the first information, the second information being information about the number of users who are expected to move from the specific facility; and
in the processing of forecasting the second information, the controller executes the processing of:
forecasting an expected destination of move defined as a destination to which the user staying in the specific facility will move from the specific facility on the basis of the candidate destination data and the user model;
forecasting an expected time slot of move defined as a time slot in which the user staying in the specific facility will start to move from the specific facility to the expected destination of move; and
wherein the user model stored in the storage unit is a model that relates the selection property of the user staying in the specific facility to a likelihood that the user having the selection property selects the respective candidate destinations and is configured to output a likelihood of selection of the respective candidate destinations when the selection property of the user staying in the specific facility is input thereto, wherein the likelihood of selection of a candidate destination at a smaller distance from the specific facility is higher than the likelihood of selection of a candidate destination at a larger distance from the specific facility; and the controller executes the processing of:
  extracting the candidate destination of which the likelihood output by the user model is highest;
  determining whether the candidate destination that was extracted is included in the candidate destinations of the move record information;
  forecasting the candidate destination that was extracted as the expected destination of move of the user staying in the specific facility in a case where the candidate destination that was extracted is not included in the candidate destinations specified by the move record information;
  forecasting the candidate destination of which the likelihood output from the user model is highest among the candidate destinations excepting the candidate destinations specified by the move record information as the expected destination of move of the user staying in the specific facility in a case where the candidate destination that was extracted is included in the candidate destinations specified by the move record information,
  calculating the number of users who are expected to move from the specific facility to the expected destination of move in each expected time slot of move on a slot-by-slot basis; and
  sending the result of the calculation to the facility terminal, wherein
the facility terminal executes the processing of dispatching taxis on the basis of the result of the calculation.

* * * * *

UNITED STATES PATENT AND TRADEMARK OFFICE
CERTIFICATE OF CORRECTION

| | |
|---|---|
| PATENT NO. | : 11,694,554 B2 |
| APPLICATION NO. | : 17/208527 |
| DATED | : July 4, 2023 |
| INVENTOR(S) | : Yoshinao Ishii et al. |

It is certified that error appears in the above-identified patent and that said Letters Patent is hereby corrected as shown below:

On the Title Page

Item (73) Replace: "TOYOTA IIDOSHA KABUSHIKI KAISHA, Toyota (JP)" with --TOYOTA JIDOSHA KABUSHIKI KAISHA, Toyota (JP)--

Signed and Sealed this
Seventeenth Day of October, 2023

Katherine Kelly Vidal
*Director of the United States Patent and Trademark Office*